(12) United States Patent
Teng

(10) Patent No.: US 7,287,380 B1
(45) Date of Patent: Oct. 30, 2007

(54) HEAT SYSTEM UTILIZING SOLAR ENERGY

(75) Inventor: Yun-Tse Teng, Taipei (TW)

(73) Assignee: Hui-Tong Digital Service Co., Ltd., Taipei (TW)

( * ) Notice: Subject to any disclaimer, the term of this patent is extended or adjusted under 35 U.S.C. 154(b) by 0 days.

(21) Appl. No.: 11/449,000

(22) Filed: Jun. 8, 2006

(51) Int. Cl.
*B60K 16/00* (2006.01)

(52) U.S. Cl. .................. 60/641.8; 60/641.15

(58) Field of Classification Search ........... 60/641.8, 60/641.15
See application file for complete search history.

(56) References Cited

U.S. PATENT DOCUMENTS

| 4,064,705 A | * | 12/1977 | Edwards et al. ............ 62/149 |
| 4,476,853 A | * | 10/1984 | Arbogast .................... 126/578 |
| 6,037,749 A | * | 3/2000 | Parsonage ................... 320/132 |
| 6,275,005 B1 | * | 8/2001 | Stadnick et al. ............ 320/122 |
| 2006/0197507 A1 | * | 9/2006 | Wang ......................... 320/166 |

* cited by examiner

*Primary Examiner*—Hoang Nguyen
(74) *Attorney, Agent, or Firm*—Birch, Stewart, Kolasch & Birch, LLP

(57) ABSTRACT

A heat system utilizing solar energy is disclosed herein, which includes at least one solar panel, an energy control unit, a temperature control device, at least one heat-radiating element, and at least one storage cell. The solar panel collects solar energy and transforms it into electric current that flows through the energy control unit, the temperature control device, and the heat-radiating element to release heat energy with a predetermined temperature; or the energy control unit directs the electric current to the storage cell for backup. When the solar energy is insufficient, the energy stored in the storage cell can be transformed under the control of the energy control unit into electric current flowing through the temperature control device and the heat-radiating element to release heat energy with a predetermined temperature.

5 Claims, 1 Drawing Sheet

HEAT SYSTEM UTILIZING SOLAR ENERGY

BACKGROUND OF THE INVENTION

1. Field of the Invention

The present invention relates to a heat system utilizing solar energy, which utilizes solar panels to collect solar energy and transform it into electric current that flows through an energy control unit, a temperature control device, and a heat-radiating element to release heat energy with a predetermined temperature; furthermore, the heat system includes a storage cell to store unused or surplus electric current for backup. Therefore, when the solar energy is insufficient, the energy stored in the storage cell can be transformed under the control of the energy control unit into electric current flowing through the temperature control device and the heat-radiating element to release heat energy with a predetermined temperature.

2. The Prior Arts

Conventional heat energy devices, such as electric heaters, electric mats, and electric carpets, primarily transform electric energy into heat energy. They use alternating electric current as an energy source because alternating electric current is cheaper and more convenient than direct electric current.

Although it is convenient for the conventional electric heating devices to directly insert its electric plug into the electric socket when use, there still are several disadvantages as follows:

(1) When the public power system comes an outage, interruption, or electric power is cut down for an individual, the electric heating devices cannot work.

(2) In suburban areas, mountains, and other remote places where the electricity cannot reach, the electric heating devices cannot also work.

(3) Due to the electric energy not being able to be stored for backup, the electric heating devices still need the public power system.

(4) When the electric heating devices have been working for a long time, which will result in the age of an outer insulation of the cable, it is easy to cause leakage of the electricity. If the power system remains supplying electricity, it will cause a danger to users.

(5) If the electric heating devices are in wet condition or spilled with water, when the electric current passes through water, the instantaneous voltage rise will be greater than 100 volts or even 220 volts above that will cause a serious electric shock to users.

(6) And the electric heating devices have the largest electricity consumption among various heat energy devices, which do not meet the needs of economizing electricity.

Thus, it is desired to provide a heat system utilizing solar energy that can improve the aforementioned drawbacks of the prior art.

SUMMARY OF THE INVENTION

A primary objective of the present invention is to provide a heat system utilizing solar energy, which transforms solar energy into heat energy and can solve the aforementioned drawbacks of the prior art.

A secondary objective of the present invention is to provide a heat system utilizing solar energy, an energy control unit and a temperature control device of which can effectively collect/control the electric current from a solar panel and controls a temperature of heat energy output.

A tertiary objective of the present invention is to provide a heat system utilizing solar energy that is a non-pollutant and outdoor heat device and may be a fixed or mobile type system.

To achieve the above-mentioned objectives, a heat system utilizing solar energy in accordance with the present invention includes at least one solar panel, an energy control unit, a temperature control device, at least one heat-radiating element, and at least one storage cell. The solar panel collects solar energy and transforms it into electric current that flows through the energy control unit, the temperature control device, and the heat-radiating element to release heat energy with a predetermined temperature; or the energy control unit directs the electric current to the storage cell for backup. When the solar energy is insufficient, the energy stored in the storage cell can be transformed under the control of the energy control unit into electric current flowing through the temperature control device and the heat-radiating element to release heat energy with a predetermined temperature.

In accordance with the present invention, the heat system utilizing solar energy further includes at least one electric input terminal connected with the energy control unit. Electric current can be inputted through the electric input terminal to the energy control unit of the heat system. The inputted electric current can be directly transformed into heat energy or be directed to the storage cell for storage for backup. Accordingly, that increases the multifunction and convenience of use.

BRIEF DESCRIPTION OF THE DRAWINGS

The present invention will be apparent to those skilled in the art by reading the following detailed description of a preferred embodiment thereof, with reference to the attached drawing, in which.

DETAILED DESCRIPTION OF THE PREFERRED EMBODIMENT

Figure 1:
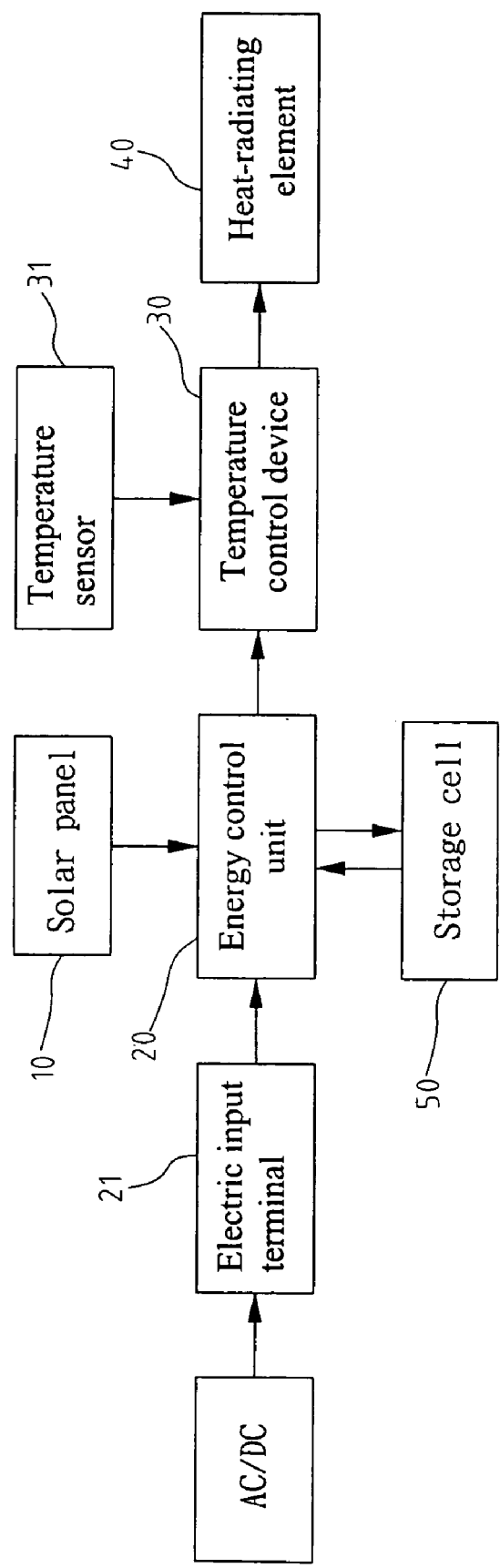
FIG. 1 is a schematic view of a heat system utilizing solar energy according to the present invention.

FIG. 1 is a schematic view of a heat system utilizing solar energy according to the present invention. The heat system comprises at least one solar panel 10, an energy control unit 20, a temperature control device 30, at least one heat-radiating element 40, and at least one storage cell 50, wherein the solar panel 10 is used for collecting solar energy and transforming the solar energy into electric current. The shape and size of the solar panel 10 may be determined according to the requirements of the system. The solar panel 10 is electrically connected to the energy control unit 20.

The energy control unit 20 is an electric current control mechanism that directs/controls the electric current. The energy control unit 20 is connected with the temperature control device 30 and the storage cell 50; the energy control unit 20 can direct the electric current to the temperature control device 30 and the heat-radiating element 40 to release heat energy, or direct the electric current to the storage cell 50 for storage.

The temperature control device 30 is connected to the heat-radiating element 40, and used for controlling the temperature of the heat energy output.

The heat-radiating element 40 is used for releasing heat energy. The heat-radiating element 40 can be a heat-radiating panel or a heat-radiating tube. The shape and material of the heat-radiating element 40 are not specially limited.

The storage cell 50 is used for storing energy and releasing the energy when required.

In accordance with the present invention, the solar panel 10 collects solar energy and transforms it into electric current that flows through the energy control unit 20, the temperature control device 30, and the heat-radiating element 40. The electric current is transformed into heat energy with a predetermined temperature by the heat-radiating element 40. The energy control unit 20 controls the flow rate of electric current and directs the electric current to the temperature control device 30 and the heat-radiating element 40 to release heat energy. The temperature control device 30 controls the temperature of the heat energy output.

When not using heat energy, or when the electric current from the solar panel 10 exceeds the needed electric current that is used to release the required heat energy, the energy control unit 20 directs the surplus electric current to the storage cell 50 for storage. When the solar panel 10 cannot collect solar energy or cannot collect enough solar energy, the electric energy stored in the storage cell 50 is directed via the energy control unit 20 to the temperature control device 30 and the heat-radiating element 40 for releasing heat energy with a predetermined temperature.

Also, referring to FIG. 1, the heat system according to the present invention further includes at least one electric input terminal 21 connected with the energy control unit 20. Direct current (DC) or alternating current (AC) that may be rectified to direct current can be inputted through the electric input terminal 21 to the energy control unit 20. The inputted electric current can directly flow through the temperature control device 30 and the heat-radiating element 40. The electric current is transformed into heat energy with a predetermined temperature by the heat-radiating element 40. Otherwise, the energy control unit 20 may direct the inputted electric current to the storage cell 50 for storage for backup.

Moreover, the structure of the heat-radiating element 40 and the places where the heat-radiating element 40 is arranged, are the factors affecting the performance of the heat system according to the present invention. Accordingly, the time of heating a space to a predetermined temperature by the heat-radiating element 40 with the same electric current depends on the factors mentioned above. For example, when the heat-radiating element 40 is in a larger space, it is harder to get a higher temperature; even if being able to get the higher temperature, it will take a longer time. Likewise, it is harder to get a higher temperature when the heat-radiating element 40 is in a cold environment.

In order to control the temperature of released heat energy of the heat-radiating element 40, the heat system according to the present invention includes at least one temperature sensor 31 connected to the temperature control device 30, which senses the surrounding temperature of the heat-radiating element 40 and transmits the sensing temperature to the temperature control device 30, thereby being able to adjust the electric current flowing through the temperature control device 30 to the heat-radiating element 40. Accordingly, an appropriate quantity of electric current is transformed by the heat-radiating element 40 into heat energy in a controlled range of temperature.

The present invention is described in detail through the preferred embodiment mentioned above; however, it is apparent to those skilled in the art that the preferred embodiment is not meant to limit the scope of the present invention. The modification and the equivalent of the present invention are within the scope of the present invention, which is set forth by the claims.

What is claimed is:

1. A heat system utilizing solar energy, comprising at least one solar panel, an energy control unit, a temperature control device, at least one heat-radiating element, and at least one storage cell;

wherein the solar panel that is electrically connected to the energy control unit, collects solar energy and transforms it into electric current;

the energy control unit that is connected to the temperature control device and the storage cell, directs the electric current through the temperature control device to the heat-radiating element for being transformed into heat energy or directs the electric current to the storage cell for backup;

the temperature control device that is connected to the heat-radiating element, controls a temperature of heat energy output;

the heat-radiating element is to release heat energy; and the storage cell stores the electric current as electric energy, or releases the electric energy into electric current;

wherein the solar panel collects solar energy and transforms it into electric current that flows through the energy control unit, the temperature control device, and the heat-radiating element to release heat energy with a predetermined temperature; while the energy stored in the storage cell can be transformed under the control of the energy control unit into electric current flowing through the temperature control device and the heat-radiating element to release heat energy.

2. The heat system utilizing solar energy according to claim 1, wherein the heat-radiating element is a heat-radiating panel.

3. The heat system utilizing solar energy according to claim 1, wherein the heat-radiating element is a heat-radiating tube.

4. The heat system utilizing solar energy according to claim 1, wherein the energy control unit includes at least one electric input terminal for inputting a direct current or an alternating current.

5. The heat system utilizing solar energy according to claim 1, wherein the temperature control device includes at least one temperature sensor connected to the temperature control device, which senses a temperature of the heat-radiating element and transmits the sensing temperature to the temperature control device to adjust the electric current flowing through the temperature control device to the heat-radiating element.

\* \* \* \* \*